(12) United States Patent
Ie et al.

(10) Patent No.: US 11,182,518 B2
(45) Date of Patent: Nov. 23, 2021

(54) APPARATUS AND METHOD FOR DESIGNING AND MANUFACTURING SHOWERHEAD

(71) Applicant: Samsung Electronics Co., Ltd., Suwon-si (KR)

(72) Inventors: Sang Yub Ie, Hwaseong-si (KR); Jung Geun Jee, Seoul (KR); Sung Youn Chung, Seoul (KR); Jae Myung Choe, Seoul (KR)

(73) Assignee: Samsung Electronics Co., Ltd.

( * ) Notice: Subject to any disclaimer, the term of this patent is extended or adjusted under 35 U.S.C. 154(b) by 395 days.

(21) Appl. No.: 16/127,692

(22) Filed: Sep. 11, 2018

(65) Prior Publication Data

US 2019/0228120 A1   Jul. 25, 2019

(30) Foreign Application Priority Data

Jan. 24, 2018   (KR) .......................... 10-2018-0008613

(51) Int. Cl.
*G06F 30/20* (2020.01)
*C23C 16/455* (2006.01)
*G06F 30/17* (2020.01)

(52) U.S. Cl.
CPC ........ *G06F 30/20* (2020.01); *C23C 16/45565* (2013.01); *G06F 30/17* (2020.01)

(58) Field of Classification Search
CPC .... G06F 30/20; G06F 30/17; C23C 16/45565
USPC .......................................................... 703/9
See application file for complete search history.

(56) References Cited

U.S. PATENT DOCUMENTS

| | | | | |
|---|---|---|---|---|
| 6,444,039 B1* | 9/2002 | Nguyen | ................ | C23C 16/455 118/715 |
| 6,631,692 B1* | 10/2003 | Matsuki | ............ | C23C 16/45565 118/723 E |
| 7,252,716 B2* | 8/2007 | Kim | .................... | C23C 16/4558 118/715 |
| 7,361,228 B2* | 4/2008 | Choi | ................... | H01J 37/3244 118/715 |
| 8,053,036 B2* | 11/2011 | Takahashi | ........... | H01J 37/3244 427/569 |
| 8,075,690 B2 | 12/2011 | Keller et al. | | |

(Continued)

FOREIGN PATENT DOCUMENTS

KR    20110013669    2/2011

*Primary Examiner* — Iftekhar A Khan
(74) *Attorney, Agent, or Firm* — Myers Bigel, P.A.

(57) ABSTRACT

An apparatus for generating 3D shape data of a showerhead includes: a data processor that generates data sets comprising information indicating values of a first distance between an upper surface of a wafer and a showerhead, information indicating positions on the wafer and information about a fluid flow physical quantity value and determines a function representing a relationship among the various information; an input unit that receives condition data comprising a target fluid flow physical quantity value for each of the positions; and a database that stores information about the function. The data processor obtains information about a second distance, which has the target fluid flow physical quantity value, between the upper surface of the wafer and the showerhead at each of the positions, extracts spatial coordinate information of a lower surface of the showerhead, and generates 3D shape data of the showerhead using the spatial coordinate information.

20 Claims, 5 Drawing Sheets

(56) References Cited

U.S. PATENT DOCUMENTS

| | | | | |
|---|---|---|---|---|
| 8,142,606 B2* | 3/2012 | Choi | H01L 31/182 | 156/345.34 |
| 8,308,865 B2* | 11/2012 | Kim | C23C 16/45572 | 118/715 |
| 8,702,867 B2* | 4/2014 | Choi | C23C 16/45565 | 118/715 |
| 9,738,977 B1* | 8/2017 | Karim | C23C 16/52 | |
| 9,758,869 B2* | 9/2017 | Choi | H01J 37/32559 | |
| 10,041,172 B2* | 8/2018 | Kim | C23C 16/45551 | |
| 10,184,178 B2* | 1/2019 | Kim | C23C 16/505 | |
| 2002/0064598 A1* | 5/2002 | Wang | H01L 21/28556 | 427/255.391 |
| 2005/0118737 A1* | 6/2005 | Takagi | H01J 37/32935 | 438/14 |
| 2005/0173569 A1* | 8/2005 | Noorbakhsh | C23C 16/45565 | 239/690 |
| 2007/0163440 A1* | 7/2007 | Kim | H01J 37/3244 | 96/52 |
| 2008/0196666 A1* | 8/2008 | Toshima | C23C 16/5096 | 118/723 E |
| 2009/0095334 A1* | 4/2009 | Huston | H01J 37/32541 | 134/105 |
| 2010/0184298 A1* | 7/2010 | Dhindsa | C23C 16/45565 | 438/710 |
| 2011/0239940 A1* | 10/2011 | Benvenuti | C23C 16/30 | 118/715 |
| 2012/0309204 A1* | 12/2012 | Kang | H01J 37/3211 | 438/719 |
| 2013/0334344 A1* | 12/2013 | Leeser | B05B 1/00 | 239/548 |
| 2014/0061324 A1* | 3/2014 | Mohn | C23C 16/45565 | 239/1 |
| 2014/0235069 A1* | 8/2014 | Breiling | C23C 16/452 | 438/778 |
| 2014/0299681 A1* | 10/2014 | Kashyap | H01J 37/3244 | 239/553.5 |
| 2015/0007770 A1* | 1/2015 | Chandrasekharan | C23C 16/45572 | 118/715 |
| 2015/0129112 A1* | 5/2015 | Saito | H01J 37/32532 | 156/89.12 |
| 2015/0214009 A1* | 7/2015 | Glukhoy | H01J 37/32091 | 239/132.3 |
| 2015/0329966 A1* | 11/2015 | Shah | C23C 16/45565 | 118/730 |
| 2016/0184838 A1* | 6/2016 | Byun | C23C 16/45574 | 239/548 |
| 2016/0340781 A1* | 11/2016 | Thomas | C23C 16/52 | |
| 2017/0002465 A1* | 1/2017 | Shaikh | H01J 37/32715 | |
| 2017/0110318 A1* | 4/2017 | Guo | C23C 16/45565 | |
| 2017/0114462 A1 | 4/2017 | Zhang et al. | | |
| 2017/0183775 A1* | 6/2017 | Yamamoto | C23C 16/345 | |
| 2017/0194128 A1 | 7/2017 | Lai et al. | | |
| 2017/0194172 A1* | 7/2017 | Mudd | H01J 37/3244 | |
| 2017/0218515 A1* | 8/2017 | Shin | H01L 21/67017 | |
| 2017/0252756 A1* | 9/2017 | Iizuka | C23C 16/45561 | |
| 2018/0002808 A1* | 1/2018 | Chung | H01L 21/02189 | |
| 2019/0040529 A1* | 2/2019 | Verbaas | C23C 16/45565 | |
| 2019/0062918 A1* | 2/2019 | Shaikh | C23C 16/45519 | |
| 2019/0177851 A1* | 6/2019 | Ivanov | C23C 16/4557 | |
| 2021/0013080 A1* | 1/2021 | Breiling | B23Q 3/15 | |

\* cited by examiner

| Gap 1 (mm) | X | Y | V (m/s) |
|---|---|---|---|
| 17 | 0 | 0 | 0.0057 |
| 17 | 0 | 1 | 0.0069 |
| 17 | 2 | 3 | 0.0092 |
| 12 | 0 | 0 | 0.0080 |
| 12 | 0 | 1 | 0.0091 |
| 12 | 2 | 3 | 0.0102 |
| 10 | 0 | 0 | 0.0112 |
| 10 | 0 | 1 | 0.0113 |
| 10 | 2 | 3 | 0.0222 |
| 7.5 | 0 | 0 | 0.0187 |
| 7.5 | 0 | 1 | 0.0156 |
| 7.5 | 2 | 3 | 0.0231 |
| ⋮ | ⋮ | ⋮ | ⋮ |

410 — Gap 1 (mm); 420 — X, Y; 430 — V (m/s)

600

| Target V | X | Y | Gap 2 |
|---|---|---|---|
| 0.0080 | 0 | 0 | 12 |
| 0.0080 | 0 | 1 | 14 |
| 0.0080 | 2 | 3 | 19 |
| ⋮ | ⋮ | ⋮ | ⋮ |

610 — Target V; 620 — X, Y; 630 — Gap 2

APPARATUS AND METHOD FOR DESIGNING AND MANUFACTURING SHOWERHEAD

This application claims the benefit of Korean Patent Application No. 10-2018-0008613, filed on Jan. 24, 2018 in the Korean Intellectual Property Office, the disclosure of which is incorporated by reference herein in its entirety.

BACKGROUND

The present disclosure relates to an apparatus and method for designing and manufacturing a showerhead.

A semiconductor manufacturing apparatus that performs thin-film deposition such as chemical vapor deposition (CVD) or atomic layer deposition (ALD) is commonly used to manufacture semiconductor devices. Such a semiconductor device deposition apparatus generally includes a showerhead in a process chamber to supply a reaction gas required for depositing a thin film on a semiconductor wafer. The showerhead sprays the reaction gas onto the wafer in an appropriate distribution required for thin-film deposition.

However, there are cases where the flow of a fluid in a semiconductor process facility apparatus including a showerhead is asymmetrical, unlike what is theoretically known. Such fluid flow characteristics can have a direct impact on the process results (such as thickness and composition) on a wafer. Therefore, there is a need to adjust the shape of the showerhead in order to solve the problem of asymmetry of the fluid flow characteristics.

SUMMARY

Aspects of the present disclosure provide a method of designing and manufacturing a showerhead, the method capable of solving the problem of asymmetry of fluid flow characteristics using statistical processing fluid flow data and shape data to be optimized, obtained based on a plurality of cases of a gap between a wafer and a showerhead.

According to an aspect of the present disclosure, an apparatus for generating three-dimensional (3D) shape data of a showerhead is provided. The apparatus includes: a data processor that generates a plurality of data sets comprising first information indicating a plurality of values of a first distance between an upper surface of a wafer and a showerhead, second information indicating a plurality of positions on the wafer and third information about a fluid flow physical quantity value and that determines and recognizes a function representing a relationship among the first information, the second information and the third information by using the plurality of data sets and through a statistical method; an input unit that receives condition data comprising numerical information related to a facility having the showerhead and a target fluid flow physical quantity value for each of the plurality of positions on the wafer; and a database that stores fourth information about the function and fifth information about a previous simulation result. The data processor obtains sixth information about a second distance, which has the target fluid flow physical quantity value, between the upper surface of the wafer and the showerhead at each of the plurality of positions on the wafer based on at least one of the fourth information and the fifth information, extracts spatial coordinate information of a lower surface of the showerhead using the second information and the sixth information, and generates 3D shape data of the showerhead using the spatial coordinate information.

According to another aspect of the present disclosure, a method of manufacturing a showerhead is provided. The method includes: receiving condition data which comprises numerical information related to a facility having a showerhead; generating a plurality of data sets, which include first information indicating a plurality of values of a first distance between an upper surface of a wafer and the showerhead, second information indicating a plurality of positions on the wafer and third information about a fluid flow physical quantity value, by using the condition data; determining and recognizing a function, which represents a relationship among the first information, the second information and the third information, by using the plurality of data sets and through a statistical method; storing fourth information about the function in a database; receiving a target fluid flow physical quantity value for each of the plurality of positions on the wafer; obtaining fifth information about a previous simulation result stored in the database; obtaining sixth information about a second distance, which has the target fluid flow physical quantity value, between the upper surface of the wafer and the showerhead at each of the plurality of positions on the wafer based on at least one of the fourth information and the fifth information; extracting spatial coordinate information of a lower surface of the showerhead using the second information and the sixth information; generating shape data of the lower surface of the showerhead using the spatial coordinate information; generating volume shape data in the generated shape data of the lower surface of the showerhead using a preset thickness value; generating 3D shape data which includes a plurality of shower holes generated in the volume shape data based on seventh information about a diameter and a depth of each of the plurality of shower holes; and manufacturing the showerhead using a 3D printer based on the generated 3D shape data.

According to another aspect of the present disclosure, a system for manufacturing a showerhead is provided. The system includes: a data processor configured to generate a plurality of data sets comprising first information indicating a plurality of values of a first distance between an upper surface of a wafer and a showerhead, second information indicating a plurality of positions on the wafer and third information about a fluid flow physical quantity value, and to determine a function representing a relationship among the first information, the second information and the third information using the plurality of data sets; an input unit configured to receive condition data comprising numerical information related to an apparatus including the showerhead and a target fluid flow physical quantity value for each of the plurality of positions on the wafer; a database configured to store fourth information about the function and fifth information about a previous simulation result; and a manufacturing unit. The data processor is configured to obtain sixth information about a second distance, which has the target fluid flow physical quantity value, between the upper surface of the wafer and the showerhead at each of the plurality of positions on the wafer based on at least one of the fourth information and the fifth information and to generate 3D shape data of the showerhead using the second information and the sixth information, and wherein the manufacturing unit is configured to build the showerhead having a plurality of shower holes defined therein by using the 3D shape data.

However, aspects of the present disclosure are not restricted to the ones set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

These and/or other aspects will become apparent and more readily appreciated from the following description of the embodiments, taken in conjunction with the accompanying drawings in which:

FIG. 4 illustrates an example of data sets generated in the showerhead manufacturing system according to embodiments;

DETAILED DESCRIPTION

As used herein the expression "and/or" includes any and all combinations of one or more of the associated listed items.

Figure 1:
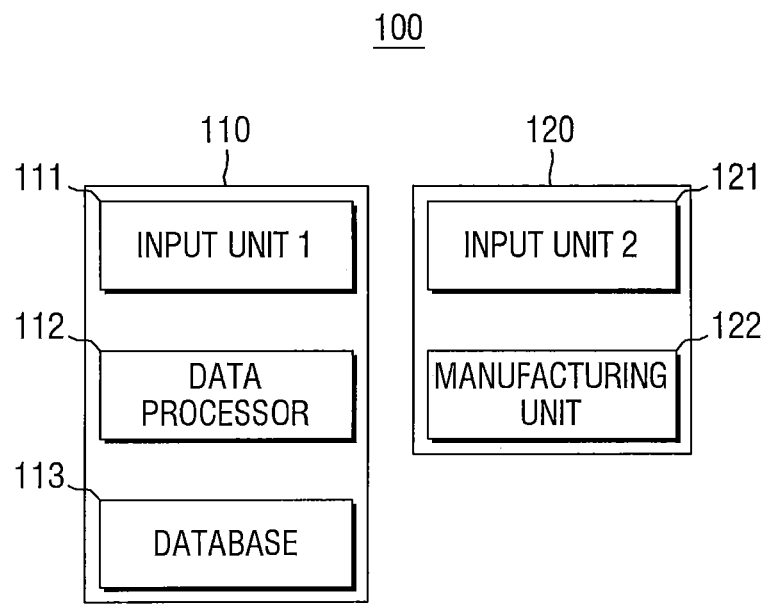
FIG. 1 is a block diagram of an example of a system for manufacturing a showerhead according to embodiments.
Figure 2:
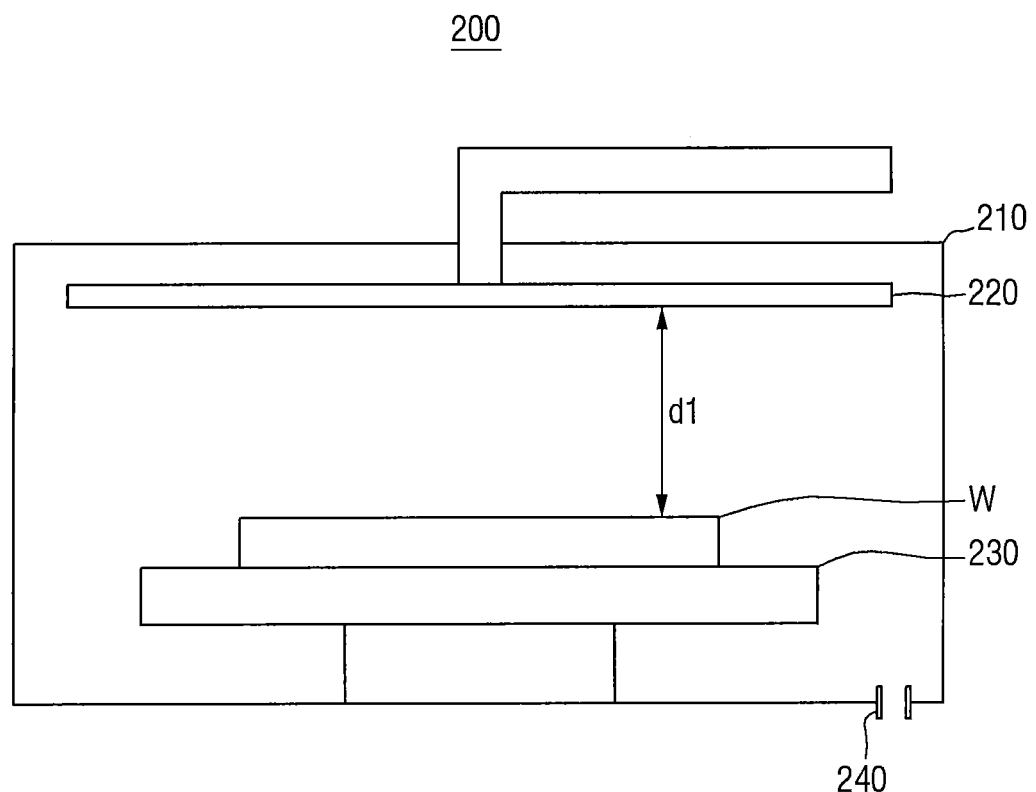
FIG. 2 is a diagram for explaining an example of condition data input to a data generating apparatus for generating three-dimensional (3D) shape data of a showerhead according to embodiments.

FIG. 1 is a block diagram of an example of a system 100 for manufacturing a showerhead according to embodiments. FIG. 2 is a diagram for explaining an example of condition data input to a data generating apparatus 110 for generating three-dimensional (3D) shape data of a showerhead according to embodiments.

Referring to FIG. 1, the showerhead manufacturing system 100 may include the data generating apparatus 110 which generates 3D shape data of a showerhead and a showerhead manufacturing apparatus 120 which manufactures a showerhead. However, the above elements may not be essential for implementing the showerhead manufacturing system 100. Therefore, the showerhead manufacturing system 100 can have more or fewer elements than those listed above.

The data generating apparatus 110 may include a first input unit or first input device 111, a data processor 112, and a database 113. However, the above elements may not be essential for implementing the data generating apparatus 110. Therefore, the data generating apparatus 110 can have more or fewer elements than those listed above.

The data generating apparatus 110 may be implemented as one of a personal computer (PC), a desktop computer, a laptop computer, a computer workstation, a tablet PC, and a mobile computing device. Here, the mobile computing device may be implemented as a mobile phone, a smart phone, an enterprise digital assistant (EDA), a mobile Internet device (MID), or the like.

The first input unit 111 may receive condition data from a user. Here, the condition data may include at least one of first data related to a first distance between a wafer and a showerhead in a semiconductor manufacturing facility, second data about a gas introduced into a chamber of the semiconductor manufacturing facility, third data about the showerhead, fourth data about a plurality of positions on the wafer, and fifth data related to a flow analysis model. However, the condition data is not limited to the above example and can include all numerical information related to the facility including the showerhead.

Referring to FIG. 2, the first data may include data about a minimum value and a maximum value of a first distance dl between an upper surface of a wafer W placed on a susceptor 230 and a showerhead 220 inside a semiconductor manufacturing facility or apparatus 200 and data about a set value of change in the first distance dl.

For example, the first input unit 111 (see FIG. 1) may receive, as the first data, the minimum and maximum values of the first distance dl limited by the size of a chamber 210 of the semiconductor manufacturing facility 200. In addition, the first input unit 111 (see FIG. 1) may receive the amount of change in the first distance dl within the minimum and maximum values.

The second data may include flow condition data of a gas introduced into the chamber 210 of the semiconductor manufacturing facility 200.

For example, the first input unit 111 (see FIG. 1) may receive flow rate data of the gas introduced into the chamber 210.

The third data may include data about the diameter of the showerhead 220, data about the number of shower holes included in the showerhead 220, data about the shape of the shower holes included in the showerhead 220, and data about the diameter of the shower holes included in the showerhead 220.

The fourth data may include coordinate information of a plurality of positions on the wafer W. For example, the fourth data may be represented by a coordinate system including an x-axis and a y-axis.

The fifth data may include size data of the chamber 210, shape data of the chamber 210, and position data of a gas outlet 240 provided in the chamber 210.

Referring back to FIG. 1, the first input unit 111 may also receive a target fluid flow physical quantity value. Here, the target fluid flow physical quantity value may be a fluid flow physical quantity value desired by the user.

The data processor 112 may perform various operations of the data generating apparatus 110 and may process data. The data processor 112 may be a central processing unit (CPU), a co-processor, an arithmetic processing unit (APU), a graphic processing unit (GPU), or the like.

By using the condition data, the data processor 112 may recognize a fluid flow physical quantity value at each of the positions on the wafer according to the value of the first distance between an upper surface of the wafer and the showerhead. Here, the fluid flow physical quantity value may include flow rate information obtained from flow analysis results. However, the fluid flow physical quantity value is not limited to the flow rate information and may also be a physical quantity value that varies according to the value of the first distance and the position on the wafer.

The data processor 112 may obtain information about the fluid flow physical quantity value at each of the positions on the wafer according to the first distance between the upper surface of the wafer and the showerhead.

The data processor 112 may generate a plurality of data sets including first information indicating a plurality of values of the first distance between the upper surface of the wafer and the showerhead, second information indicating the positions on the wafer, and third information about the fluid flow physical quantity value. Here, the third information may be a fluid flow physical quantity value measured at each of the positions according to the first distance between the upper surface of the wafer and the showerhead.

For example, the data processor 112 may generate a plurality of data sets, each represented by (x, y, g, v). Here, x and y are values representing a position on the wafer, g is a value indicating the first distance between the upper surface of the wafer and the showerhead, and v is a fluid flow physical quantity value obtained based on the values of x, y and g.

By using the data sets, the data processor 112 may recognize a function representing the relationship among the first information indicating the values of the first distance between the upper surface of the wafer and the showerhead, the second information indicating the positions on the wafer, and the third information about the fluid flow physical quantity value.

Specifically, the showerhead manufacturing system 100 may calculate and recognize information about a function, which represents the relationship between the condition data and the fluid flow physical quantity value, through a statistical method.

According to some embodiments, the function calculated and recognized through the statistical method may be stored in the database 113. The function may represent the relationship between the condition data and the fluid flow physical quantity value.

The database 113 may store information about a previous simulation result. The showerhead manufacturing system 100 may update the stored information about the previous simulation result by using a correlation function, which is a new simulation result, between the condition data and the fluid flow physical quantity value.

In an example, it is assumed that a correlation function between the distance between the upper surface of the wafer and the showerhead and the fluid flow physical quantity value is obtained at 49 points in the semiconductor manufacturing facility 200 (see FIG. 2).

Statistical correlation functions obtained at 10 points by the data processor 112 may be in the form of a specific function. The statistical correlation function obtained at each of the 10 points may be stored in the database 113 and updated. Since the 49 points have been extracted from one semiconductor manufacturing facility 200 (see FIG. 2), the remaining 39 points may be physically and hydrodynamically closely related to the 10 points where the statistical correlation functions have already been calculated. At the remaining 39 points that are closely related to the 10 points where the statistical correlation functions have already been calculated, the data processor 112 may obtain statistical correlation functions between the distance between the showerhead and the upper surface of the wafer and the fluid flow physical quantity value by using the form of the specific function as an input.

In addition, a statistical correlation function obtained at an eleventh point may be stored in the database 113 and updated. Then, the statistical correlation functions obtained at the 11 points by the data processor 112 may be used as an input in the calculation for obtaining statistical correlation functions at the remaining 38 points.

Through machine learning, the data processor 112 may store a statistical correlation function obtained at each point in the database 113 and update the stored statistical correlation function. In the calculation for obtaining a statistical correlation function at each point, the data processor 112 may use the form of a specific function derived at previous points, where statistical correlation functions have already been calculated, as an input through machine learning.

Since statistical correlation functions that have already been obtained are used as an input in the calculation for obtaining a statistical correlation function, the time required to calculate a correlation function between the distance between the upper surface of the wafer and the showerhead and the fluid flow physical quantity value at each point can be reduced. In addition, the accuracy of the correlation function between the distance between the upper surface of the wafer and the showerhead and the fluid flow physical quantity value at each point can be improved.

If the data processor 112 finds a statistical correlation function at each point by sequentially substituting various functions, it may take a long time to obtain the statistical correlation function at each point. In addition, the physical meaning of the obtained statistical correlation function cannot be guaranteed.

While a case where the form of a specific function obtained at 10 points is used as an input in the calculation for obtaining statistical correlation functions at the remaining 39 points has been described above, the present disclosure is not limited to this case. That is, when the form of a specific function is derived at a plurality of points, the data processor 112 may use the form of the specific function to obtain statistical correlation functions at the remaining points.

Here, the "form of the specific function" may be the form of a single function such as an exponential function, a log or logarithmic function, a trigonometric function or a polynomial function or may be the form of a combination of at least two types of functions.

In another example, the database 113 may store information about a previous simulation result. For example, the previous simulation result may be a simulation result of a first showerhead obtained using the showerhead manufacturing system 100. The data processor 112 may use the previous simulation result of the first showerhead as an input to calculate a statistical correlation function for a second showerhead similar to the first showerhead.

For example, a semiconductor manufacturing facility or apparatus having the second showerhead may have the same or similar structural data as a semiconductor manufacturing facility or apparatus having the first showerhead. If the structural data of the semiconductor manufacturing facilities are the same or similar except for the distance between the showerhead and the wafer, a statistical correlation function for the second showerhead is highly likely to have the form of a function similar to a statistical correlation function derived from the simulation of the first showerhead.

By using the simulation result of a showerhead as an input for simulation of another similar showerhead as described above, it is possible to reduce the time required to calculate a correlation function between the first distance between the upper surface of the wafer and the showerhead and the fluid flow physical quantity value. In addition, it is possible to improve the accuracy of the correlation function between the first distance between the upper surface of the wafer and the showerhead and the fluid flow physical quantity value. Furthermore, since the simulation results of similar showerheads are stored and updated through machine learning, the relationship between the first distance between the upper surface of the wafer and the showerhead and the fluid flow physical quantity value in a semiconductor manufacturing facility can be derived as a physically meaningful result.

The data processor 112 may obtain fifth information about a second distance, which has the target fluid flow physical quantity value, between the upper surface of the wafer and the showerhead at each of the positions based on at least one of the function representing the recognized relationship and the previous simulation result stored in the database 113.

The data processor 112 may generate 3D shape data of the showerhead using the fifth information.

The showerhead manufacturing apparatus 120 may include a second input unit 121 and a manufacturing unit 122. However, the above elements may not be essential for implementing the showerhead manufacturing apparatus 120. Therefore, the showerhead manufacturing apparatus 120 can have more or fewer elements than those listed above.

The showerhead manufacturing apparatus 120 may be a separate apparatus from the data generating apparatus 110. However, the present disclosure is not limited thereto, and the showerhead manufacturing apparatus 120 may also be a different element from the data generating apparatus 110 included in the same apparatus.

The second input unit 121 may receive 3D shape data generated by the data generating apparatus 110.

In some embodiments, the second input unit 121 may serve as a passage through which the showerhead manufacturing apparatus 120 is connected to the data generating apparatus 110. The second input unit 121 may be or include a wired or wireless data port.

In some other embodiments, the second input unit 121 may be or include a wired or wireless communication module that receives the 3D shape data generated by the data generating apparatus 110.

In an example, the second input unit 121 may receive the 3D shape data generated by the data generating apparatus 110 through wireless Internet technology such as wireless local area network (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), or long term evolution-advanced (LTE-A).

In another example, the second input unit 121 may receive the 3D shape data generated by the data generating apparatus 110 using at least one of Bluetooth™, radio frequency identification (RFID), infrared data association (IrDA), ultra wideband (UWB), zigbee, near field communication (NFC), Wi-Fi, Wi-Fi direct, and wireless universal serial bus (wireless USB).

The manufacturing unit 122 may manufacture a showerhead based on the 3D shape data received through the second input unit 121. Here, the manufacturing unit 122 may be or include a 3D printer that manufactures a showerhead having a 3D shape using 3D shape data (e.g., data generated by a program such as 3D computer aided design (CAD)).

The manufacturing unit 122 may manufacture a showerhead using a material such as an aluminum alloy or stainless steel (e.g., SUS304) containing chromium and nickel.

The manufacturing unit 122 may perform heat treatment and surface polishing on the showerhead manufactured using the 3D shape data to enhance the mechanical and chemical properties of the showerhead.

Figure 3:
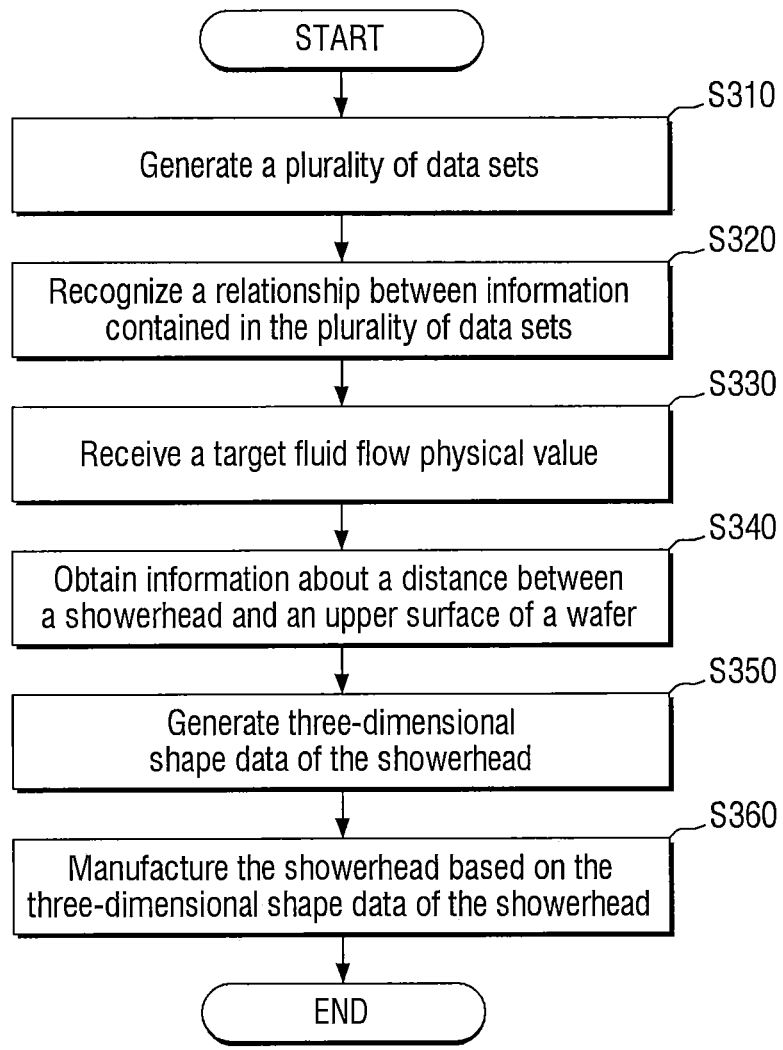
FIG. 3 is a flowchart illustrating an example of a method of manufacturing a showerhead using a system for manufacturing a showerhead according to embodiments.
Figures 5, 6:
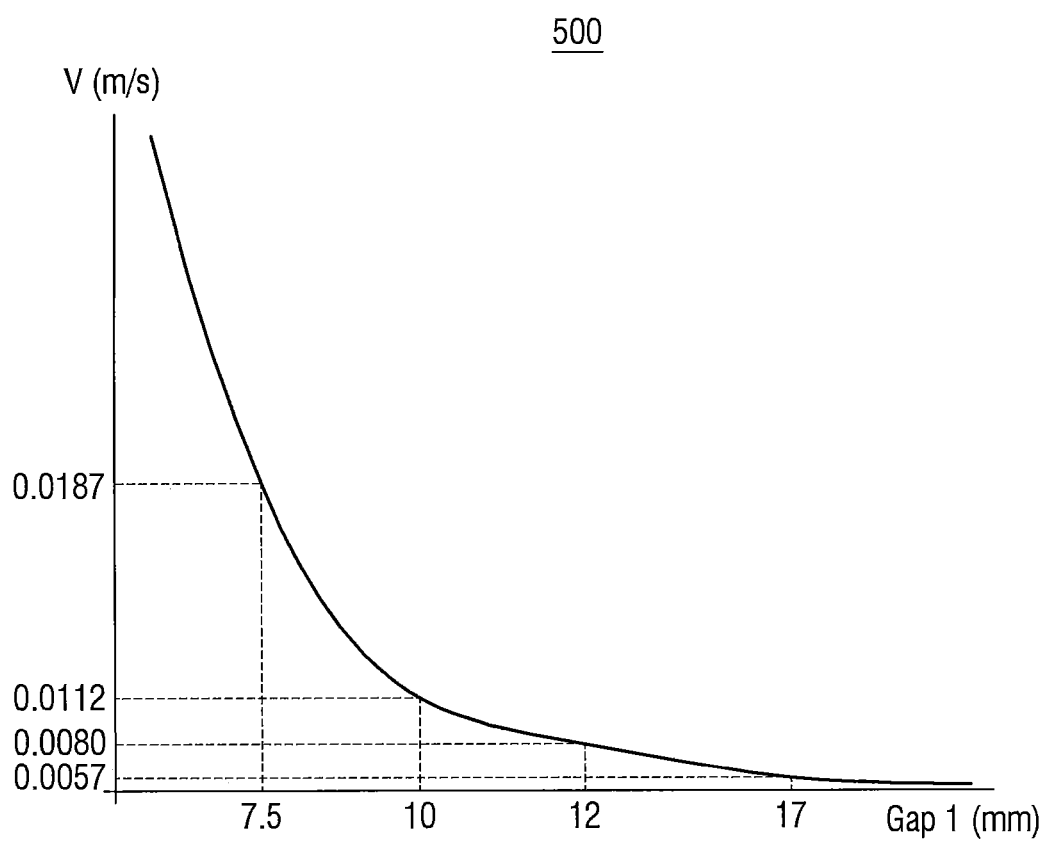
FIG. 5 is a graph for explaining an example of a method of analyzing fluid flow analysis results in the showerhead manufacturing system according to embodiments.
FIG. 6 is a chart for explaining an example of a method of obtaining a gap corresponding to a target fluid flow physical value in the showerhead manufacturing system according to embodiments.
Figure 7:
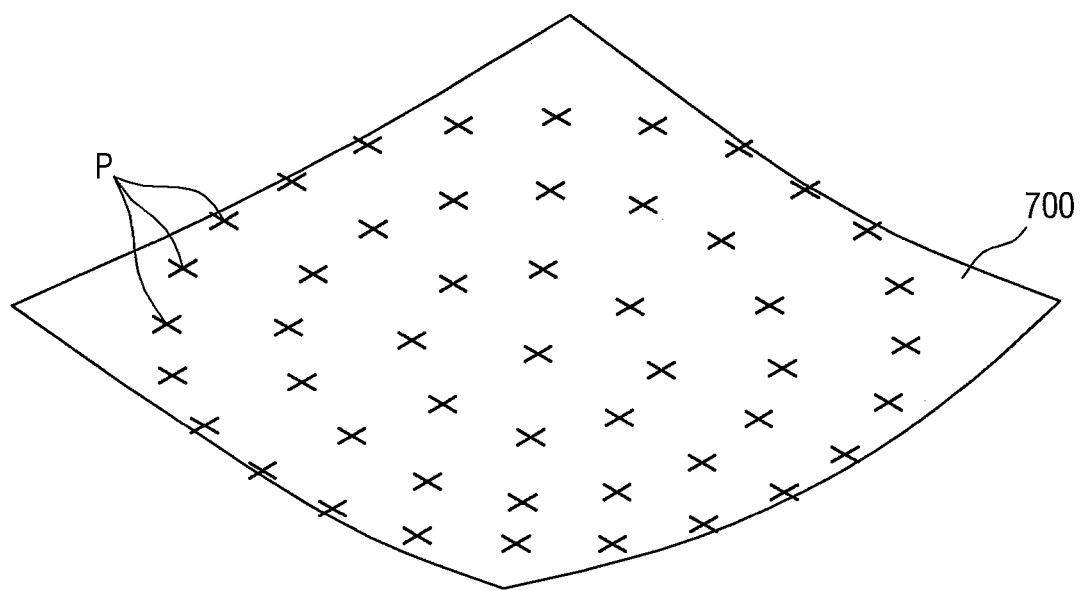
FIG. 7 is a diagram for explaining an example of a method of generating a 3D shape of a showerhead in the showerhead manufacturing system according to embodiments.
Figure 8:
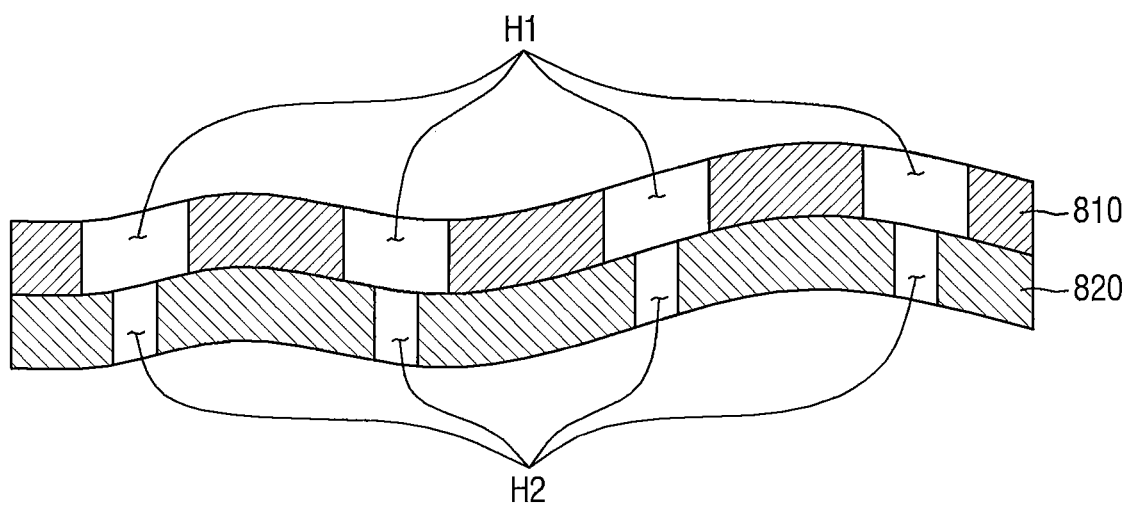
FIG. 8 is a diagram for explaining an example of a method of generating holes in a showerhead in the showerhead manufacturing system according to embodiments.

FIG. 3 is a flowchart illustrating an example of a method of manufacturing a showerhead using a system for manufacturing a showerhead according to embodiments. FIG. 4 illustrates an example of data sets generated in the showerhead manufacturing system according to embodiments. FIG. 5 is a graph for explaining an example of a method of analyzing fluid flow analysis results in the showerhead manufacturing system according to embodiments. FIG. 6 is a chart for explaining an example of a method of obtaining a gap corresponding to a target fluid flow physical value in the showerhead manufacturing system according to the embodiments. FIG. 7 is a diagram for explaining an example of a method of generating a 3D shape of a showerhead in the showerhead manufacturing system according to embodiments. FIG. 8 is a diagram for explaining an example of a method of generating holes in a showerhead in the showerhead manufacturing system according to embodiments.

Referring to FIG. 3, the showerhead manufacturing system may generate a plurality of data sets (operation S310).

Specifically, a data generating apparatus included in the showerhead manufacturing system may receive condition data before generating a plurality of data sets. Here, the condition data may include at least one of first data related to a first distance between an upper surface of a wafer and a showerhead, second data about a gas introduced into a chamber, third data about the showerhead, fourth data about a plurality of positions on the wafer, and fifth data related to a flow analysis model. In the interest of brevity, since the condition data has been described above with reference to FIG. 1, a detailed description of the condition data is omitted below.

By using the received condition data, the data generating apparatus may recognize third information about a fluid flow physical quantity value measured at each of the positions on the wafer for each of a plurality of values of the first distance between the upper surface of the wafer and the showerhead.

The data sets generated in operation S310 may include first information about the values of the first distance between the upper surface of the wafer and the showerhead, second information indicating each of the positions on the wafer, and the third information about the fluid flow physical quantity value.

Referring to FIG. 4, a plurality of data sets 400 may include first information 410 indicating a plurality of values of the first distance between an upper surface of a wafer and a showerhead. Here, the first information 410 may include a plurality of length values input by a user within maximum and minimum values of the first distance or automatically set within the maximum and minimum values of the first distance.

The data sets 400 may include second information 420 indicating a plurality of position on the wafer. Each of the positions on the wafer may be represented by (x, y) values in a coordinate system including an x-axis and a y-axis.

In FIG. 4, only three positions (e.g., a first position where an x value is 0 and a y value is 0, a second position where the x value is 0 and the y value is 1, and a third position where the x value is 2 and the y value is 3) are illustrated. However, the present disclosure is not limited to this case.

The data sets 400 may include third information 430 about fluid flow physical quantity values. The third information 430 may include a fluid flow physical quantity value measured at each of the positions for each of a plurality of length values of the first distance.

For example, when the value of the first distance is 17 mm at the first position where the x value is 0 and the y value is 0, the data generating apparatus may recognize a flow rate of 0.0057 m/s as a fluid flow physical quantity value through fluid flow analysis calculation. In this case, the data generating apparatus may store information indicating that the fluid flow physical quantity value at the first position is 0.0057 m/s at a distance of 17 mm as a first data set.

In another example, when the value of the first distance is 12 mm at the first position where the x value is 0 and the y value is 0, the data generating apparatus may recognize a flow rate of 0.0080 m/s as a fluid flow physical quantity value through fluid flow analysis calculation. In this case, the data generating apparatus may store information indicating that the fluid flow physical quantity value at the first position is 0.0080 m/s at a distance of 12 mm as a second data set.

In another example, when the value of the first distance is 17 mm at the second position where the x value is 0 and the y value is 1, the data generating apparatus may recognize a flow rate of 0.0069 m/s as a fluid flow physical quantity value through fluid flow analysis calculation. In this case, the data generating apparatus may store information indicating that the fluid flow physical quantity value at the second position is 0.0069 m/s at a distance of 17 mm as a third data set.

In another example, when the value of the first distance is 12 mm at the second position where the x value is 0 and the y value is 1, the data generating apparatus may recognize a flow rate of 0.0091 m/s as a fluid flow physical quantity value through fluid flow analysis calculation. In this case, the data generating apparatus may store information indicating that the fluid flow physical quantity value at the second position is 0.0091 m/s at a distance of 12 mm as a fourth data set.

Consequently, the data generating apparatus may generate a plurality of data sets by measuring a fluid flow physical quantity value at each position on the wafer for each values of the first distance, as illustrated in FIG. 4.

The showerhead manufacturing system may recognize the relationship between the information contained in the data sets generated in operation S310 (operation S320).

Specifically, the showerhead manufacturing system may calculate or determine and recognize information about a function representing the relationship between the condition data and the fluid flow physical quantity value through a statistical method.

For example, by using the data sets and through a statistical method, the showerhead manufacturing system may calculate or determine a function representing the relationship among the first information indicating the first distance between the upper surface of the wafer and the showerhead, the second information indicating the positions on the wafer, and the third information about the fluid flow physical quantity value measured at each of the positions according to the value of the first distance. In this case, the showerhead manufacturing system may extract information about a function representing an optimum relationship, which corresponds to the input condition data, through deep learning (e.g., data fitting, a regression neural network, a feedforward network, etc.). That is, when the condition data is input, the showerhead manufacturing system may search for a function representing an optimal relationship in a database and output an optimum fluid flow physical quantity value.

For example, referring to FIG. 5, the data generating apparatus may generate a graph 500 illustrating the relationship between the value of the first distance and the fluid flow physical value at the first position on the wafer. By using the above-described statistical method, the data generating apparatus may recognize information about a function representing the relationship between the value of the first distance and the fluid flow physical value.

According to some embodiments, the function obtained in operation S320 of FIG. 3 may be stored in the database.

The database may store information about a previous simulation result. Here, the previous simulation result may include a function previously obtained through a statistical method.

In addition, the showerhead manufacturing system may update the stored information about the previous simulation result using a correlation function, which is a new simulation result, between the condition data and the fluid flow physical quantity value.

Referring back to FIG. 3, the showerhead manufacturing system may receive a target fluid flow physical quantity value (operation S330). Here, the target fluid flow physical quantity value may be a fluid flow physical quantity value desired by a user.

The showerhead manufacturing system may obtain information about a second distance, which may have the target fluid flow physical quantity value input in operation S330, between the upper surface of the wafer and the showerhead, e.g., based on the relationship recognized in operation S320 (operation S340).

Referring to FIG. 6, the data generating apparatus may receive a target fluid flow physical quantity value 610 (e.g., 0.0080 m/s). In this case, the data generating apparatus may obtain information 630 indicating the second distance between the upper surface of the wafer and the showerhead at each of a plurality of positions 620 on the wafer by using the information about the function representing the relationship between the information contained in the data sets or the information about the previous simulation result.

For example, the data generating apparatus may obtain information indicating that the second distance having a target fluid flow physical quantity value of 0.0080 m/s at the first position where the x value is 0 and the y value is 0 is 12 mm. In addition, the data generating apparatus may obtain information indicating that the second distance having the target fluid flow physical quantity value of 0.0080 m/s at the second position where the x value is 0 and the y value is 1 is 14 mm.

In this way, the data generating apparatus may obtain information indicating the second distance, which has the target fluid flow physical quantity value, at each of the positions.

Referring back to FIG. 3, the showerhead manufacturing system may generate 3D shape data of the showerhead using fifth information about the second distance between the upper surface of the wafer and the showerhead obtained in operation S340 (operation S350).

Specifically, the data generating apparatus may extract spatial coordinate information of a lower surface of the showerhead by using the second information indicating the positions on the wafer and the fifth information about the second distance, which has the target fluid flow physical quantity value, between the upper surface of the wafer and the showerhead at each of the positions. The data generating apparatus may generate values of an x-axis and a y-axis in the spatial coordinate information based on the second information and generate a value of a z-axis in the spatial coordinate information based on the fifth information.

Referring to FIG. 7, the data generating apparatus may generate a plurality of points P in image data, which is represented in a 3D space, by using the spatial coordinate information. For example, the image data may be data generated by a program such as 3D CAD.

The data generating apparatus may generate shape data of the lower surface of the showerhead using the extracted spatial coordinate information. The shape data may be image data 700 illustrated in FIG. 7.

For example, the data generating apparatus may connect the points P to generate one 3D surface. In this case, the data generating apparatus may form a 3D surface by reducing a grid size or multiplying an arbitrary constant to smooth the connection between the points P. Here, the 3D surface may be the shape data of the lower surface of the showerhead.

The data generating apparatus may generate volume shape data by reflecting a preset thickness value in the shape data of the lower surface of the showerhead generated in FIG. 7. The data generating apparatus may generate 3D shape data using the shape data and the volume shape data of the lower surface of the showerhead.

The data generating apparatus may generate a plurality of holes or channels in the generated 3D shape data of the showerhead. Here, the position and shape of each of the holes may be a position and a shape input by the user.

If the size of the diameter of shower holes included in the upper surface of the showerhead corresponds to the size of the diameter of shower holes included in the lower surface of the showerhead, the data generating apparatus may generate 3D shape data of the showerhead and then generate a plurality of shower holes in the generated 3D shape data.

Referring to FIG. 8, the size of the diameter of a plurality of shower holes or channels H1 included in an upper surface or upper portion 810 of a showerhead may be different from the size of the diameter of a plurality of shower holes or channels H2 included in a lower surface or lower portion 820 of the showerhead. In this case, the data generating apparatus may generate 3D shape data of the upper surface 810 and 3D shape data of the lower surface 820 and then generate shower holes in each of the 3D shape data.

When the 3D shape data of the showerhead is generated, the data generating apparatus may additionally generate shapes of components or parts (e.g., fastening bolt holes, screw threads, etc.), which are required for assembly in a semiconductor manufacturing facility, in the 3D shape data.

Referring back to FIG. 3, the showerhead manufacturing system may manufacture a showerhead, e.g., using a 3D printer, based on the 3D shape data of the showerhead generated in operation S350 (operation S360).

The showerhead may be manufactured using a material such as an aluminum alloy or stainless steel (e.g., SUS304) containing chromium and nickel.

The showerhead manufacturing apparatus may perform heat treatment and surface polishing on the showerhead manufactured using the 3D shape data to enhance the mechanical and chemical properties of the showerhead.

If the showerhead manufactured by the showerhead manufacturing system according to the embodiments is installed in a manufacturing facility to produce a semiconductor device, the asymmetry of fluid flow characteristics can be reduced to some extent.

The showerhead manufactured using the showerhead manufacturing system may be installed in a semiconductor manufacturing facility or apparatus (indicated by reference numeral 200 in FIG. 2). The semiconductor manufacturing facility equipped with the showerhead manufactured using the showerhead manufacturing system can be used to manufacture a semiconductor device (e.g., used in a deposition process, an etching process, etc.).

In addition, if a semiconductor manufacturing facility including a first showerhead model is used in a first semiconductor device manufacturing process, a film deposited on a wafer on which the first semiconductor device manufacturing process is performed may have a different thickness at each position on the wafer. Otherwise, the wafer on which the first semiconductor device manufacturing process is performed may be etched to a different degree at each position on the wafer. If the non-uniformity of the wafer, which is a result of the semiconductor device manufacturing process, is large; the yield, performance and reliability of a semiconductor device may deteriorate.

To solve the above problem, a second showerhead model improved from the first showerhead model may be manufactured using the showerhead manufacturing system. If a semiconductor manufacturing facility including the second showerhead model is used in the first semiconductor device manufacturing process, the yield, performance and reliability of a semiconductor device can be improved.

Although some embodiments of the present inventive concept have been disclosed for illustrative purposes, those skilled in the art will appreciate that various modifications, additions and substitutions are possible, without departing from the scope and spirit of the inventive concept as disclosed in the accompanying claims.

What is claimed is:

1. An apparatus for generating three-dimensional (3D) shape data of a showerhead for a semiconductor manufacturing facility, the apparatus comprising:
    a data processor that generates a plurality of data sets comprising first information indicating a plurality of values of a first distance between an upper surface of a wafer and a showerhead, second information indicating a plurality of positions on the wafer and third information about a fluid flow physical quantity value including flow rate information at each of the plurality of positions on the wafer, and that determines and recognizes a function representing a relationship among the first information, the second information and the third information by using the plurality of data sets and through a statistical method;
    an input unit that receives condition data comprising numerical information related to a facility having the showerhead and a target fluid flow physical quantity value including a flow rate for each of the plurality of positions on the wafer that is input by a user; and
    a database that stores fourth information about the function and fifth information about a previous simulation result,
    wherein the data processor obtains sixth information about a second distance between the upper surface of the wafer and the showerhead at each of the plurality of positions on the wafer based on the target fluid flow physical quantity value and at least one of the fourth information and the fifth information, extracts spatial coordinate information of a lower surface of the showerhead using the second information and the sixth information, and generates 3D shape data of the showerhead using the spatial coordinate information,
    wherein the fluid flow physical quantity value is a value measured by performing fluid flow analysis calculation for a length of the first distance at each of the plurality of positions on the wafer,
    wherein the second distance is a distance such that the target fluid flow physical quantity value input by the user at each of the plurality of positions on the wafer has a specific value.

2. The apparatus of claim 1, wherein the third information comprises the fluid flow physical quantity value measured at each of the plurality of positions on the wafer for each of the plurality of values of the first distance between the upper surface of the wafer and the showerhead.

3. The apparatus of claim 1, wherein the data processor recognizes the function representing the relationship between the fluid flow physical quantity value measured at each of the plurality of positions on the wafer and each of the plurality of values of the first distance between the upper surface of the wafer and the showerhead.

4. The apparatus of claim 1, wherein the input unit receives the condition data before the plurality of data sets are generated.

5. The apparatus of claim 4, wherein the data processor recognizes the fluid flow physical quantity value, which is measured at each of the plurality of positions on the wafer for each of the plurality of values of the first distance between the upper surface of the wafer and the showerhead, as the third information by using the condition data.

6. The apparatus of claim 5, wherein the condition data comprises at least one of first data related to each of the plurality of values of the first distance between the upper surface of the wafer and the showerhead, second data about a gas introduced into a chamber, third data about the showerhead, fourth data about the plurality of positions on the wafer, and fifth data related to a flow analysis model.

7. The apparatus of claim 1, wherein the data processor generates shape data of the lower surface of the showerhead using the spatial coordinate information and generates volume shape data in the generated shape data of the lower surface of the showerhead using a preset thickness value.

8. The apparatus of claim 1, wherein the data processor further generates a plurality of shower holes in the generated 3D shape data.

9. A method of manufacturing a showerhead for a semiconductor manufacturing facility, the method comprising:
receiving condition data which comprises numerical information related to a facility having a showerhead;
generating a plurality of data sets, which comprise first information indicating a plurality of values of a first distance between an upper surface of a wafer and the showerhead, second information indicating a plurality of positions on the wafer and third information about a fluid flow physical quantity value including flow rate information at each of the plurality of positions on the wafer, by using the condition data;
determining and recognizing a function, which represents a relationship among the first information, the second information and the third information, by using the plurality of data sets and through a statistical method;
storing fourth information about the function in a database;
receiving a target fluid flow physical quantity value including a flow rate for each of the plurality of positions on the wafer, the target fluid flow physical quantity value input by a user;
obtaining fifth information about a previous simulation result stored in the database;
obtaining sixth information about a second distance between the upper surface of the wafer and the showerhead at each of the plurality of positions on the wafer based on the target fluid flow physical quantity value and at least one of the fourth information and the fifth information;
extracting spatial coordinate information of a lower surface of the showerhead using the second information and the sixth information;
generating shape data of the lower surface of the showerhead using the spatial coordinate information;
generating volume shape data in the generated shape data of the lower surface of the showerhead using a preset thickness value;
generating 3D shape data which comprises a plurality of shower holes generated in the volume shape data based on seventh information about a diameter and a depth of each of the plurality of shower holes; and
manufacturing the showerhead using a 3D printer based on the generated 3D shape data,
wherein the fluid flow physical quantity value is a value measured by performing fluid flow analysis calculation for a length of the first distance at each of the plurality of positions on the wafer,
wherein the second distance is a distance such that the target fluid flow physical quantity value input by the user at each of the plurality of positions on the wafer has a specific value.

10. The method of claim 9, wherein the third information comprises the fluid flow physical quantity value measured at each of the plurality of positions on the wafer for each of the plurality of values of the first distance between the upper surface of the wafer and the showerhead.

11. The method of claim 9, wherein, in the determining and the recognizing of the function representing the relationship among the first information, the second information and the third information by using the plurality of data sets and through the statistical method, the function representing a relationship between the fluid flow physical quantity value measured at each of the plurality of positions on the wafer and each of the plurality of values of the first distance between the upper surface of the wafer and the showerhead is recognized.

12. The method of claim 9, wherein the determining and the recognizing of the function representing the relationship among the first information, the second information and the third information by using the plurality of data sets and through the statistical method further comprises extracting the function corresponding to the condition data through a regression neural network or a feedforward network.

13. The method of claim 12, wherein the generating of the plurality of data sets further comprises recognizing the fluid flow physical quantity value, which is measured at each of the plurality of positions on the wafer for each of the plurality of values of the first distance between the upper surface of the wafer and the showerhead, as the third information by using the condition data.

14. The method of claim 13, wherein the condition data comprises at least one of first data related to each of the plurality of values of the first distance between the upper surface of the wafer and the showerhead, second data about a gas introduced into a chamber, third data about the showerhead, fourth data about the plurality of positions on the wafer, and fifth data related to a flow analysis model.

15. The method of claim 9, wherein, in the generating of the shape data of the lower surface of the showerhead using the spatial coordinate information, grid points are generated on the lower surface of the showerhead using the spatial coordinate information, and the shape data is generated by connecting the grid points.

16. A system for manufacturing a showerhead for a semiconductor manufacturing facility, the system comprising:
a data processor configured to generate a plurality of data sets comprising first information indicating a plurality of values of a first distance between an upper surface of a wafer and a showerhead, second information indicating a plurality of positions on the wafer and third information about a fluid flow physical quantity value including flow rate information at each of the plurality of positions on the wafer, and to determine a function representing a relationship among the first information, the second information and the third information using the plurality of data sets;

an input unit configured to receive condition data comprising numerical information related to an apparatus comprising the showerhead and a target fluid flow physical quantity value including a flow rate for each of the plurality of positions on the wafer that is input by a user;

a database configured to store fourth information about the function and fifth information about a previous simulation result; and a manufacturing unit, wherein the data processor is further configured to obtain sixth information about a second distance between the upper surface of the wafer and the showerhead at each of the plurality of positions on the wafer based on the target fluid flow physical quantity value and at least one of the fourth information and the fifth information and to generate 3D shape data of the showerhead using the second information and the sixth information, and wherein the manufacturing unit is configured to build the showerhead having a plurality of shower holes defined therein by using the 3D shape data, wherein the fluid flow physical quantity value is a value measured by performing fluid flow analysis calculation for a length of the first distance at each of the plurality of positions on the wafer, wherein the second distance is a distance such that the target fluid flow physical quantity value input by the user at each of the plurality of positions on the wafer has a specific value.

17. The system of claim 16, wherein the third information comprises the fluid flow physical quantity value measured at each of the plurality of positions on the wafer according to the plurality of values of the first distance between the upper surface of the wafer and the showerhead.

18. The system of claim 16, wherein the condition data comprises at least one of first data related to the plurality of values of the first distance between the upper surface of the wafer and the showerhead, second data about a gas introduced into a chamber, third data about the showerhead, fourth data about the plurality of positions on the wafer, and fifth data related to a flow analysis model.

19. The system of claim 16, wherein the data processor is further configured to extract spatial coordinate information of a lower surface of the showerhead using the second information and the sixth information, to generate shape data of the lower surface of the showerhead using the spatial coordinate information, and to generate volume shape data in the generated shape data of the lower surface of the showerhead using a preset thickness value.

20. The system of claim 16, wherein the manufacturing unit is configured to manufacture the showerhead using a 3D printer with the showerhead comprising at least one of an aluminum (Al) alloy and stainless steel containing chromium and nickel.

* * * * *